(12) United States Patent
Hedman

(10) Patent No.: US 11,828,238 B2
(45) Date of Patent: Nov. 28, 2023

(54) METHOD IN A TWO-STROKE ENGINE AND TWO-STROKE ENGINE

(71) Applicant: Hedman Ericsson Patent AB, Flen (SE)

(72) Inventor: Mats Hedman, Sparreholm (SE)

(73) Assignee: Hedman Ericsson Patent AB, Flen (SE)

(*) Notice: Subject to any disclaimer, the term of this patent is extended or adjusted under 35 U.S.C. 154(b) by 0 days.

(21) Appl. No.: 16/754,036

(22) PCT Filed: Oct. 16, 2018

(86) PCT No.: PCT/SE2018/051052
§ 371 (c)(1),
(2) Date: Apr. 6, 2020

(87) PCT Pub. No.: WO2019/078772
PCT Pub. Date: Apr. 25, 2019

(65) Prior Publication Data
US 2020/0325834 A1 Oct. 15, 2020

(30) Foreign Application Priority Data
Oct. 16, 2017 (SE) .................... 1700245-2

(51) Int. Cl.
*F02D 13/02* (2006.01)
*F02B 75/02* (2006.01)
(Continued)

(52) U.S. Cl.
CPC ............ *F02D 13/0223* (2013.01); *F01L 9/16* (2021.01); *F01L 9/20* (2021.01); *F02B 75/02* (2013.01); *F02B 2075/025* (2013.01)

(58) Field of Classification Search
CPC ......... F02D 13/0223; F01L 9/026; F01L 9/04; F01L 9/16; F01L 9/20; F01L 7/12;
(Continued)

(56) References Cited

U.S. PATENT DOCUMENTS 1,172,324 A * 2/1916 Tuttle ................. F02B 25/00
123/58.5
1,645,170 A * 10/1927 William ............... F02B 17/00
123/26
(Continued)

FOREIGN PATENT DOCUMENTS

DE          470031 C     1/1929
DE        37 25 626 A1   2/1989
(Continued)

OTHER PUBLICATIONS

Pattakon, "PatAT: Asymmetric Timing in the two-stroke engines", <https://web.archive.org/web/20140913181551/http://www.pattakon.com/pattakonPatAT.htm> (Year: 2014).*
(Continued)

*Primary Examiner* — John M Zaleskas
*Assistant Examiner* — Joshua Campbell
(74) *Attorney, Agent, or Firm* — Foley & Lardner LLP

(57) ABSTRACT

The present invention concerns a method in a two-stroke engine comprising at least one cylinder (1) with a reciprocating piston (2), a delimited combustion space (5), at least one outlet port (7) and an inlet port (9) which are both uncovered at the bottom dead center position of the piston, an actuator (8) which activates a valve (17) to open and introduce combustion air via an inlet pipe (6), a control system (15) which controls the actuator to open the valve in order to introduce combustion air via the inlet port. The invention is characterized in that the inlet port is closed by
(Continued)

the piston after the outlet port has been closed, thus the opposite compared to the two-stroke engines of today.

4 Claims, 7 Drawing Sheets

(51) Int. Cl.
  *F01L 9/16* (2021.01)
  *F01L 9/20* (2021.01)
(58) Field of Classification Search
  CPC .............. F01L 2710/003; F02B 75/02; F02B 2075/025; F02B 2700/038; F02B 25/04; F02B 25/24; F16J 10/00; F16J 10/02
  See application file for complete search history.

(56) References Cited

U.S. PATENT DOCUMENTS

| | | | | | |
|---|---|---|---|---|---|
| 2,177,020 | A | * | 10/1939 | Fuscaldo | F01L 1/38 123/65 R |
| 4,313,403 | A | * | 2/1982 | Bie, Jr. | F02B 19/06 123/48 D |
| 4,911,115 | A | * | 3/1990 | Boyesen | F02D 13/0284 123/65 PE |
| 5,007,382 | A | * | 4/1991 | Kawamura | F02D 13/0257 123/90.11 |
| 5,465,702 | A | * | 11/1995 | Ferrenberg | F02G 3/02 123/543 |
| 2003/0192492 | A1 | * | 10/2003 | Yuasa | F02F 1/22 123/73 PP |
| 2005/0045122 | A1 | * | 3/2005 | Yang | F01L 7/12 123/90.11 |

FOREIGN PATENT DOCUMENTS

| | | | | |
|---|---|---|---|---|
| EP | 0 342 893 | A1 | | 11/1989 |
| EP | 0342893 | A1 | * | 11/1989 |
| FR | 611730 | | | 10/1926 |
| FR | 611730 | A | * | 10/1926 ............. F02B 25/00 |
| GB | 2 376 502 | A | | 12/2002 |
| JP | 5060617 | A | * | 5/1975 |
| JP | S50-060617 | A | | 5/1975 |
| JP | H03-149328 | A | | 6/1991 |
| JP | H07-317544 | A | | 12/1995 |
| JP | H09-329031 | A | | 12/1997 |
| SE | 1400367 | A1 | | 1/2016 |
| WO | WO-95/33131 | | | 12/1995 |
| WO | WO-03/002858 | A1 | | 1/2003 |
| WO | WO-03002858 | A1 | * | 1/2003 ............. F02B 25/14 |
| WO | WO-2004/011786 | A1 | | 2/2004 |
| WO | WO-2016018184 | A1 | * | 2/2016 .......... F02D 13/028 |

OTHER PUBLICATIONS

International Search Report regarding Appl. No. PCT/SE2018/051052, dated Dec. 11, 2018, 4 pps.
European Search Report regarding European Application No. 18868345.2 dated Aug. 6, 2021, 6 pages.

* cited by examiner

METHOD IN A TWO-STROKE ENGINE AND TWO-STROKE ENGINE

The present invention concerns a method in a two-stroke engine, and a two-stroke engine operating according to the method.

The present invention concerns a new two-stroke engine operating like an ordinary two-stroke engine in the sense that exhaust gases are evacuated before combustion air and fuel is introduced, but with a substantial difference being that the inlet port is situated above the exhaust port. In conventional two-stroke engines, the inlet port is situated below the exhaust port.

BACKGROUND

A piston moves between two end positions, a top dead center and a bottom dead center. At the top dead center, a compression space transitions into a combustion space, which space is delimited by the movable piston and the cylinder head. The movement of the piston from the bottom dead center towards the top dead center is referred to as the compression stroke, and the subsequent movement from the top dead center towards the bottom dead center is referred to as the expansion or working stroke. Following the working stroke, gas exchange occurs. Exhaust gases are removed and new combustion air is introduced, after which a new compression stroke follows. This two-stroke process is the main principle of the engine.

In the two-stroke engines of today, gas exchange occurs at the end of the working stroke by means of the piston first uncovering an exhaust port, through which exhaust gases flow out, often in a pulsating manner due to overpressure. Thereafter, an inlet port is uncovered, and new combustion air is introduced, where after the compression stroke starts. A major disadvantage is unclean exhaust gas, caused by combustion air with fuel and/or lubricating oil which to a certain extent flows out through the exhaust port to the surrounding atmosphere. This is caused by that the ports for inlet and exhaust are open overlapping simultaneously and that the exhaust port is closed after the inlet port.

Using freely controllable valves in the cylinder head, poppet valves like in the four-stroke engines of today, the problems with unclean exhaust gas can be reduced to a great extent. The engines presented in Swedish patents SE529569 and SE529570 have freely controllable and electromagnetically, hydraulically or pneumatically activated valves in the cylinder head intended to, amongst others, achieve a two-stroke engine with higher efficiency and cleaner exhaust gases. In these patents, the exhaust valve shall, in order to reduce discharge of unclean exhaust gas, open to discharge exhaust gas and close before the inlet valve is opened and closed for intake of combustion air. Of the above mentioned types of freely controllable valves, the pneumatically activated valves are so far those which can achieve the shortest time for opening and closing a motor valve. At 8 mm valve lift, being the maximum distance from the valve seat in the cylinder head to a fully open valve, the shortest time is 5 ms (the duration in an ordinary 400 cm³ cylinder), which means that the time required from that outlet valve is opened until the inlet valve is closed is 10 ms.

This time is no problem at low speeds such as for example 1000 RPM, when the time for one revolution of the engine is 60 ms, but as higher speed are desired, for example from 2000 RPM and upwards, the time to perform gas exchange gets shorter, and consequently, the time for compression gets shorter, and the length of the compression stroke gets increasingly short, resulting in a reduced compression rate. In a two-stroke engine having a maximum speed of 3000 RPM (corresponding to a normal maximum speed of 6000 RPM in a four-stroke engine), the time for one revolution is 20 ms. If half of that time is to be used for gas exchange, it is realized that problems occur, which can be summarized in that, at constant charge air pressure, and intake of pressurized combustion air, the compression rate is reduced with a resulting reduction in efficiency as the engine speed increases.

With ports for intake and exhaust in the cylinder which are uncovered and closed by the reciprocating movement of the piston, respectively, as in the two-stroke engines of today, or in the two stroke engine according to the present invention, said problem with reduced compression rate and reduced efficiency as the speed increases does not occur. The two-stroke engines of today however have problems related to unclean exhaust gas, as mentioned in the second paragraph under Background above, since the ports for inlet and exhaust are open simultaneously, and the exhaust port closes after the inlet port.

PURPOSE OF THE INVENTION

The purpose of the invention is to reduce the problem with unclean exhaust gas in the two-stroke engines of today. The invention concerns a two-stroke engine operating like an ordinary two-stroke engine in the sense that exhaust gases are evacuated before combustion air with or without fuel is introduced, but with substantial and characterizing differences, namely on the one hand that the inlet port is situated above the exhaust port and on the other hand that combustion air is introduced after the exhaust port has been closed by the piston during the compression stroke.

During the working stroke, the piston first passes the inlet port, which outside itself is closed via a controllable valve, and thereafter passes the exhaust port whereby exhaust gases are evacuated and the piston reaches its bottom dead center position. As the piston thereafter is on its way towards its top dead center position, it first passes the exhaust port, which is consequently closed, whereafter the piston reaches the uncovered inlet port. When the piston reaches the inlet port, the controllable valve is opened and combustion air flows through the controllable valve and inlet port into the cylinder until the inlet port is closed by the piston. Thereby, compression of introduced combustion air is initiated. The compression rate is constant and independent of speed, and the opening duration of the port is reduced as the speed increases.

When the piston uncovers the outlet port, a pulse of pressurized exhaust gases flows out through the outlet port, whereby a negative pressure is created, which remains as the piston reaches the inlet port and combustion air flows in. The negative pressure increases as the speed and engine load increases, which promotes addition of new combustion air, and as the speed increases, compensates for shorter time for the addition.

Since the outlet and inlet ports are not open simultaneously, the problem with unclean exhaust gas as in the two-stroke engines of today cannot occur. Another problem with the two-stroke engines of today is that the benefits of an exhaust driven turbine for production of charge air, pressurized combustion air, is limited by overlapping open ports, while charge air flows out into the exhaust port rather than remaining in the cylinder and increasing the pressure therein before the compression stroke is initiated. The present invention solves also this problem.

In the area around the bottom dead center position of the piston, the piston speed is low, and at the bottom dead center, the piston is completely stationary for a moment. This means that the outlet area can be made smaller compared to the two-stroke engines of today since there is more time for evacuation of exhaust gases. If the exhaust area further is distributed over several low exhaust ports, the working stroke becomes longer, resulting in an improved efficiency. By realizing the exhaust area with an arrangement which makes its size variably adjustable to the different operating conditions of the engine, a continuous negative pressure can be created in the cylinder caused by the pulsating outflow of the exhaust gases, while the negative pressure remains as the exhaust is closed by the piston, and may consequently be put to use as the controllable valve is opened for introduction of new combustion air.

The controllable valve may be pneumatically, hydraulically or electromagnetically activated, where the latter type is preferred since no pressurized air or hydraulic oil is needed but instead only electricity which is always at hand. Furthermore, new technology are available for electromagnetically activated, or solenoid activated engine valves which result in the possibility for equally fast valve opening as for a pneumatically activated valve opening.

The above-described purposes with the present invention are achieved by the scope of protection defined by the patent claims described after the description.

Figure 1:
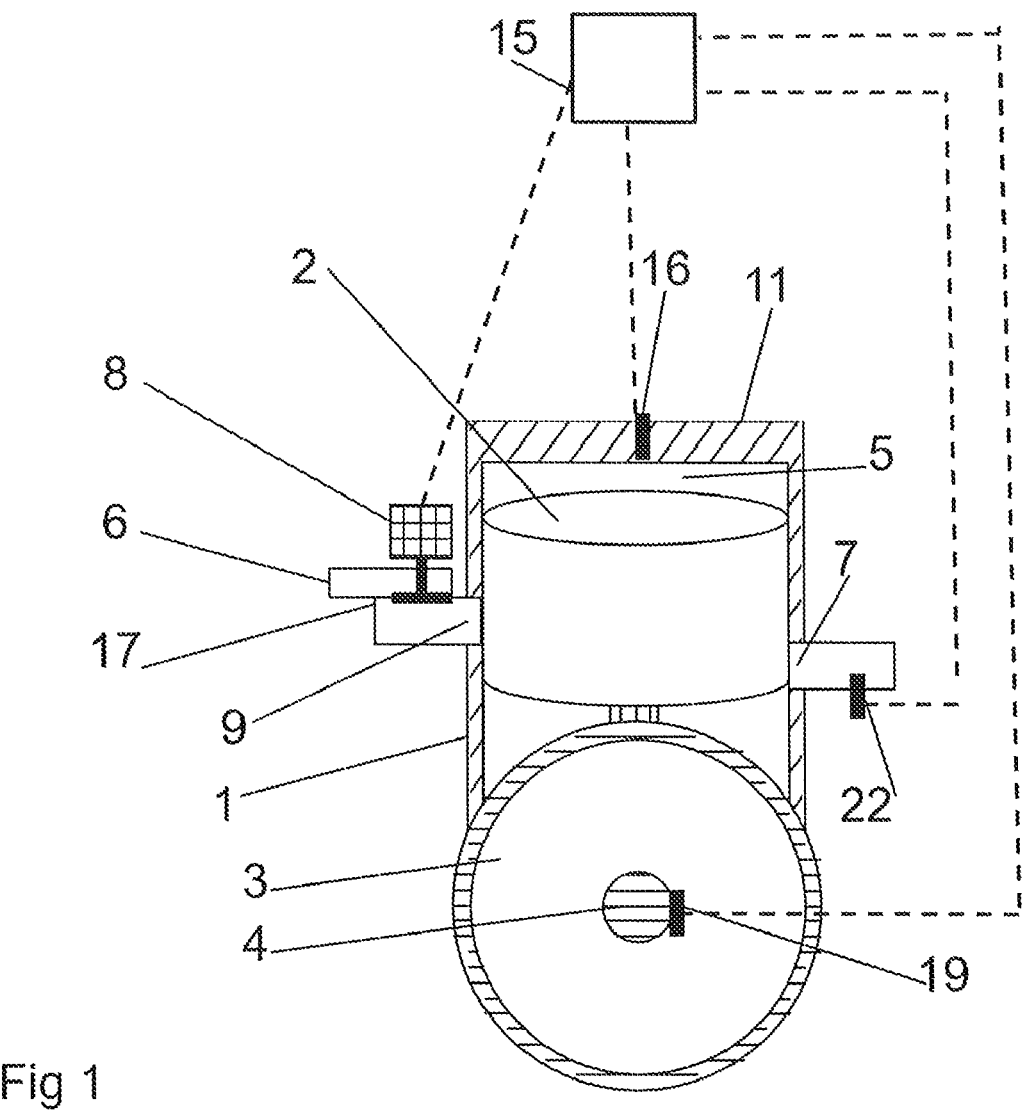
FIG. 1 shows a two-stroke engine according to the invention comprising at least one cylinder 1 with a cylinder head 11, a piston 2 reciprocating in the cylinder, which piston covers the exhaust port 7 when the inlet port 9 is closed. Combustion and expansion stroke are to be initiated. A flywheel 3 is mounted on a crankshaft 4 on which a piston rod with said piston is arranged in a conventional manner. A combustion space 5 is disposed between the piston and the cylinder head. Combustion air is introduced to the combustion space from an inlet pipe 6 via a controllable valve 17 which is controlled to be open and closed by an actuator 8. On the crankshaft, a sensor or crankshaft probe 19 is arranged whose signals are read by a motor control system 15, which thereby registers the position of the piston in the cylinder, and orders the actuator to open and close said valve at the appropriate time. The piston is shown at its top dead center position where it covers an outlet port 7. In the exhaust pipe, an oxygen sensor 22 is arranged, whose signals are read by the engine control system 15. Using the oxygen detector, the ratio between fuel and combustion air can be controlled to be optimal based on the present exhaust aftertreatment system. It should be mentioned that the oxygen detector in some cases is not appropriate, for example in smaller engines such as in chainsaws, which must be lightweight and either operate at idle or at full throttle. Any spark plug 16 is arranged for engines where the fuel is to be ignited by means of a spark ordered by the engine control system at an optimal timing with regard to engine efficiency. In diesel engine applications, 16 represents a diesel fuel injector. The shown embodiment is appropriate also in smaller engines, such as garden machines, chain saws, motorcycles amongst others. It should be noted that the figure shows principally what is needed to apply the invention.
Figure 2:
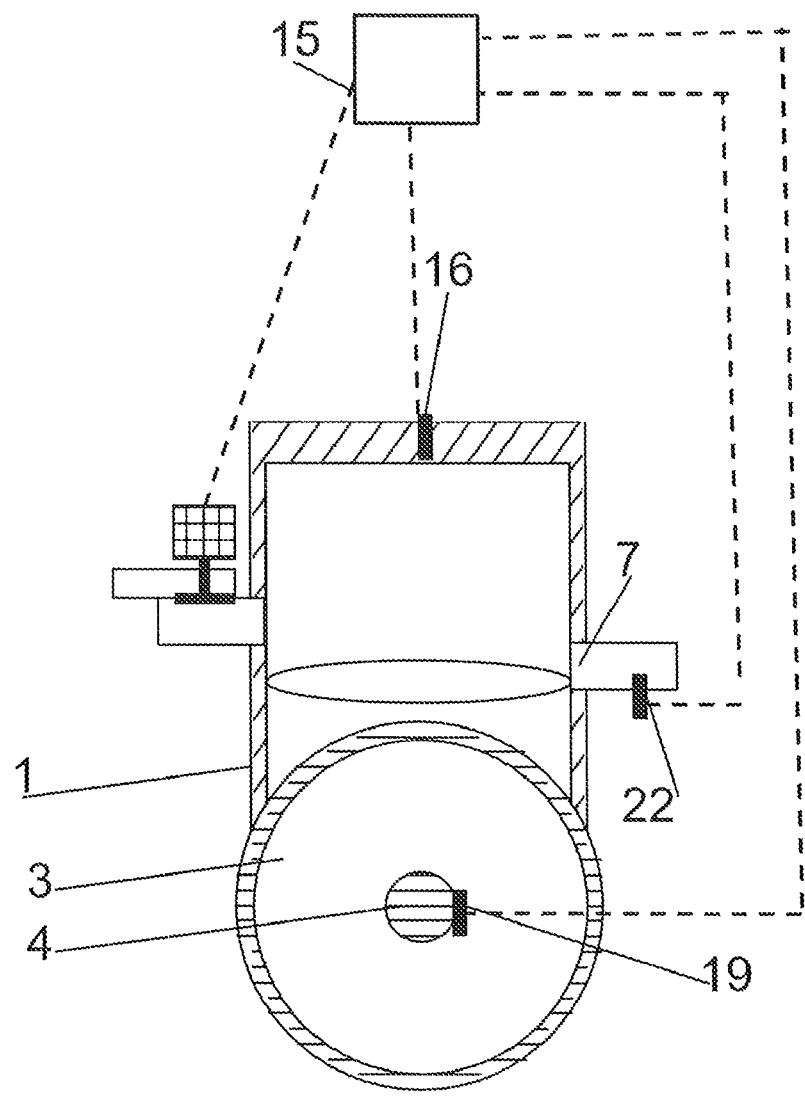
FIG. 2 shows the bottom dead center position of the piston in the cylinder, where an exhaust port 7 has been uncovered, whereby pressurized exhaust gases, often in a pulsating manner, flows out through said port to an exhaust system. If there is ambient pressure in the exhaust system, and the cylinder pressure is more than two bars as the port is uncovered, the exhaust gases initially flow out at the speed of sound, so called critical flow, and a short term negative pressure is created in the cylinder. The exhaust gases can propel an exhaust turbo by means of which the engine can be overloaded, which normally does not work well in a conventional two-stroke engine. In the area around the bottom dead center position of the piston, the piston speed is low, and at said bottom dead center the piston is stationary for a moment. This means that the exhaust area can be made smaller compared to today's two-stroke engines since there is more time for evacuation of the exhaust gases. If the exhaust area further is distributed over several low exhaust ports, the working stroke becomes longer, resulting in improved efficiency.
Figure 3:
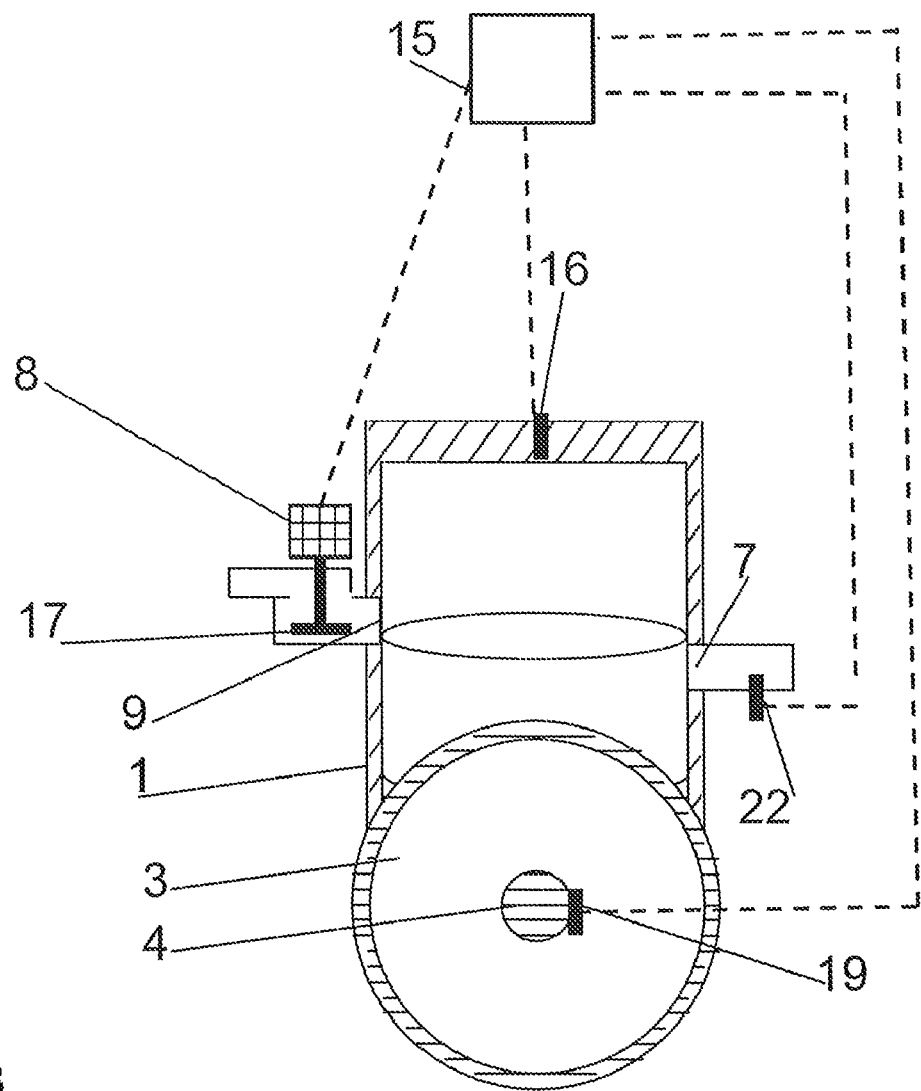
FIG. 3 illustrates the piston just having closed the outlet port 7 and reaching the uncovered inlet port 9 during the compression stroke. The engine control system has ordered the actuator 8 to open the valve 17, whereby combustion air, with or without fuel, is introduced to the combustion chamber via the inlet port. The short-term negative pressure described above with reference to FIG. 2 is used during introduction of combustion air. It should be mentioned that the space outside the inlet port 9 with the valve 17 can be embodied in many different ways to minimize the volume outside the inlet port.
Figure 4:
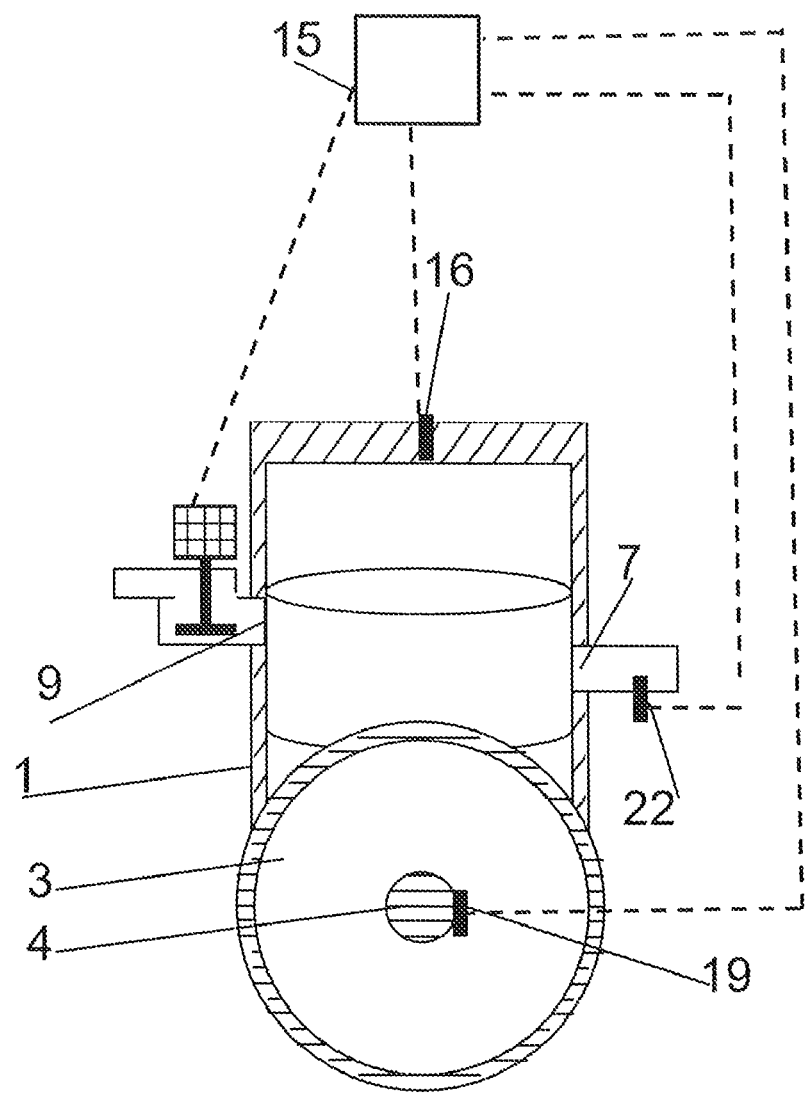
FIG. 4 shows the cylinder according to FIG. 1, where the piston has closed the inlet port and compression of introduced combustion air has started while the controllable valve is still open. It is consequently realized that the most important aspect of the controllable valve 17 is that it can, by means of the actuator 8, be opened quickly in order to introduce combustion air, Closing of the inlet port takes place automatically by means of the piston 2.
Figure 5:
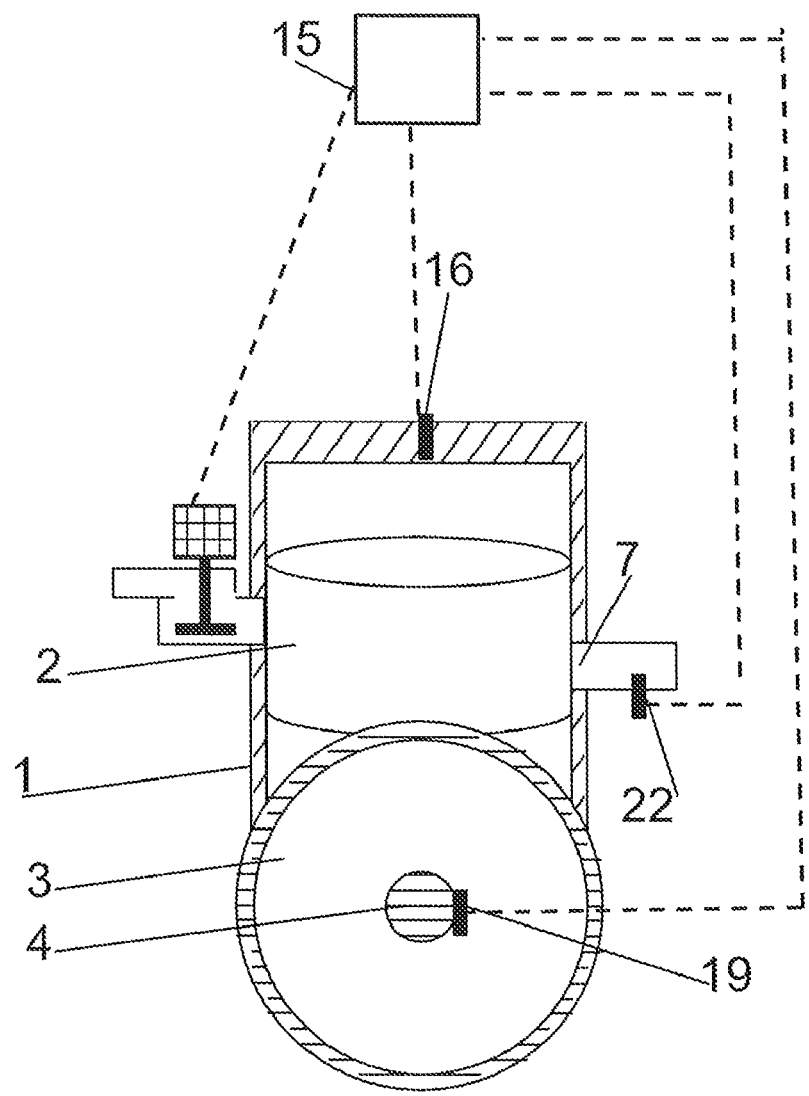
FIG. 5 shows the cylinder according to FIG. 1 during a compression stroke.
Figure 6:
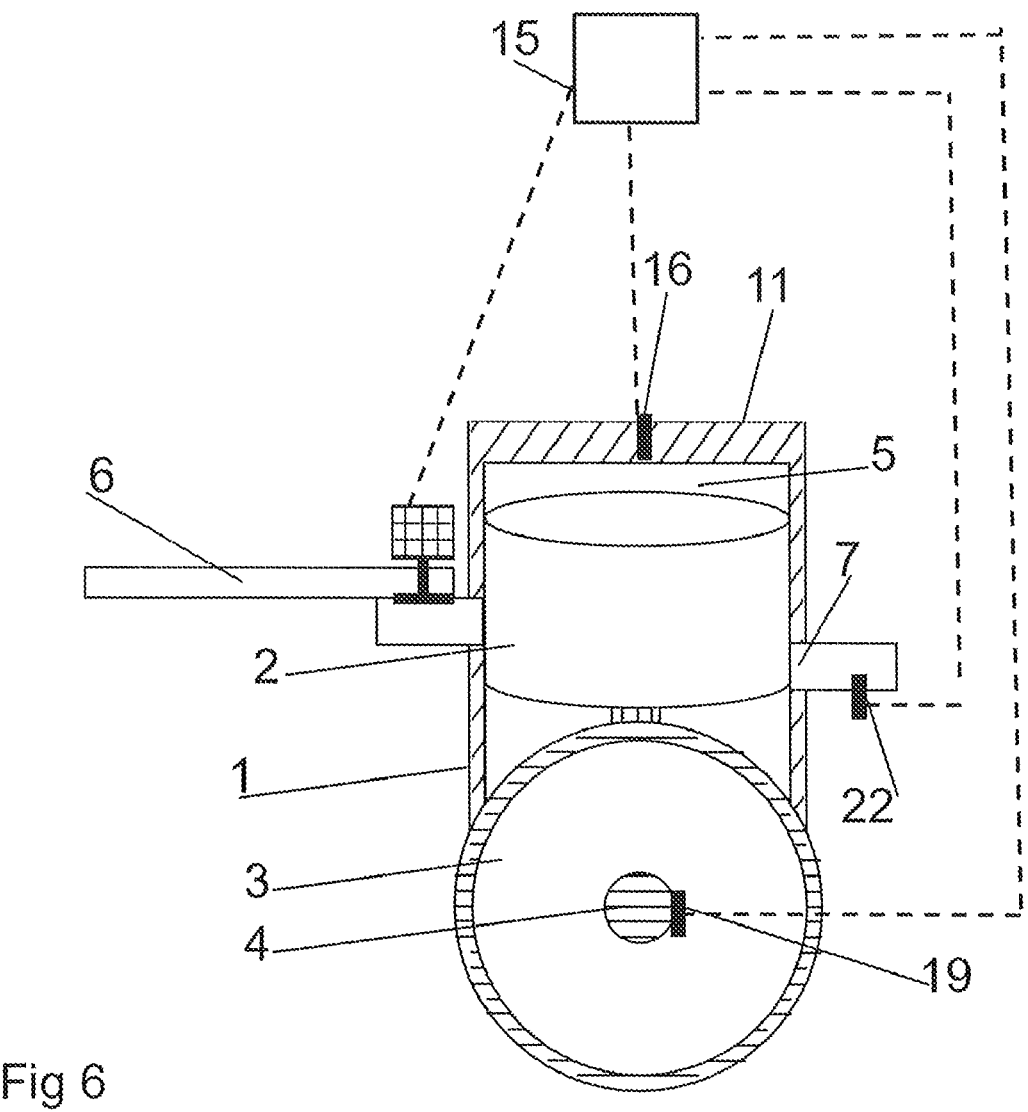
FIG. 6 shows the cylinder according to FIG. 5 with a lengthened, so called tuned, inlet pipe 6, which corresponds to known so called tuned exhaust pipes. The purpose is to increase the mass of introduced combustion air at high speeds caused by an amplified pulse of introduced combustion air by means of the whole air mass in the inlet pipe being set in motion, which is achieved at existing negative pressure in the cylinder as the piston reaches the inlet port and the controllable valve is opened. Consequently, a greater mass of air is introduced to the cylinder compared to the mass of air which would be introduced to the cylinder using a short inlet pipe 6 in accordance with FIG. 5. If the crank case is used to introduce crank case compressed air into the cylinder, a lengthened pipe can instead be connected to the crank case to achieve a corresponding effect.
Figure 7:
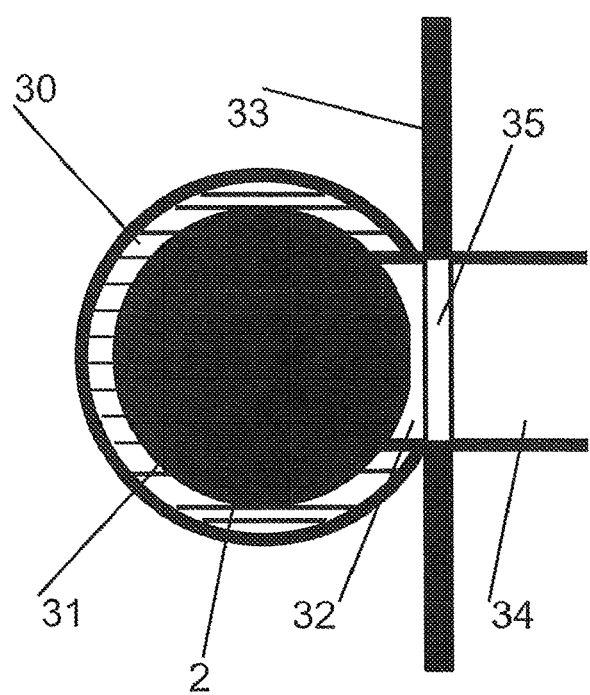
FIG. 7 is intended to show the cylinder wall 30 (dotted) with the piston 2 at the bottom dead center with an exhaust port 32 completely uncovered, an exhaust pipe 34 with a slideable exhaust throttle 33 with an opening 35 to control the exhaust flow through the exhaust port. The exhaust throttle is controlled by control means being connected to the engine control system 15 (not shown) based on the current need for torque, in this case maximum torque.
Figure 8:
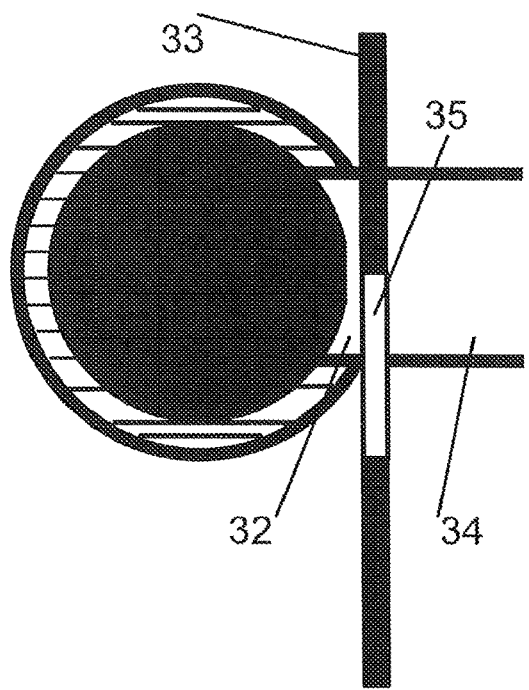
FIG. 8 shows the situation in FIG. 7 with the exhaust throttle which, by means of the engine control system based on the current need for torque, has been controlled to place the opening 35 such that the possible exhaust flow to the exhaust pipe is approximately halved.

The invention claimed is:

1. A method of operating a two-stroke engine, the two-stroke engine comprising at least one cylinder with a reciprocating piston, a delimited combustion space, at least one outlet port and at least one inlet port, each inlet port being disposed above the at least one outlet port, wherein the piston forms part of a slide valve arrangement such that the piston, after being at a bottom dead center position, reaches the at least one inlet port after the at least one outlet port has been closed by the piston, wherein the inlet and outlet ports are both uncovered when the piston is at a bottom dead center position, and a pneumatic, hydraulic or electromagnetic actuator arranged to open a thereto connected valve in order to introduce the combustion air without fuel into the combustion space via an inlet pipe and the inlet port, the method comprising ordering, by a control system, the actuator to:

keep the valve closed when the at least one outlet port is uncovered, open the valve after the piston moves from the bottom dead center position such that the valve is brought to open after the outlet port has been closed by the piston, wherein opening of the valve takes place in connection with the piston reaching the inlet port, and close the valve after the piston has moved further from the bottom center position such that the closing of the valve from a fully open position is initiated after the inlet port has been closed by the piston.

2. The method according to claim 1, wherein each inlet port is configured to introduce the combustion air without fuel into the combustion space.

3. A two-stroke engine comprising at least one cylinder and a reciprocating piston therein which delimits a combustion space, wherein a lower portion of the combustion space is provided with at least one outlet port and at least one inlet port, each inlet port being disposed above the at least one outlet port, wherein the engine further comprises:

a pneumatic, hydraulic or electromagnetic actuator for opening of a valve via which combustion air without fuel is introduced via an inlet pipe, and a control system comprising sensors and software controlling the actuator to open and close the inlet pipe, wherein the piston forms part of a slide valve arrangement such that the piston, after being at a bottom dead center position, reaches the at least one inlet port after the at least one outlet port has been closed by the piston, and wherein the control system is configured to order the actuator to keep the valve closed when the outlet port is uncovered, to open the valve in connection with the piston reaching the inlet port, and to initiate closing of the valve from a fully open position after the inlet port has been closed by the piston.

4. The two-stroke engine according to claim 3, wherein each inlet port is configured to introduce the combustion air without fuel into the combustion space.

* * * * *